(12) United States Patent
Jolfaei (10) Patent No.: US 9,219,774 B2
(45) Date of Patent: Dec. 22, 2015

(54) EXCHANGE OF CALLBACK INFORMATION (75) Inventor: Masoud Aghadavoodi Jolfaei, Wiesloch (DE)

(73) Assignee: SAP SE, Walldorf (DE)

( * ) Notice: Subject to any disclaimer, the term of this patent is extended or adjusted under 35 U.S.C. 154(b) by 1187 days.

(21) Appl. No.: 12/619,478

(22) Filed: Nov. 16, 2009

(65) Prior Publication Data

US 2011/0119326 A1 May 19, 2011

(51) Int. Cl.
G06F 15/16 (2006.01)
H04L 29/08 (2006.01)

(52) U.S. Cl.
CPC .................................. H04L 67/02 (2013.01)

(58) Field of Classification Search
CPC ........................................................ H04L 67/02
USPC ................................................. 709/203, 206
See application file for complete search history.

(56) References Cited

U.S. PATENT DOCUMENTS

| | | | | |
|---|---|---|---|---|
| 6,687,877 B1* | 2/2004 | Sastry | G06F 17/241 | 709/204 |
| 6,898,617 B2* | 5/2005 | Doolittle | G06F 9/5027 | 709/201 |
| 7,031,904 B1* | 4/2006 | Wilson et al. | | 709/230 |
| 7,233,655 B2* | 6/2007 | Gailey | G10L 15/22 | 379/210.01 |
| 7,958,232 B1* | 6/2011 | Colton | H04L 67/2823 | 709/224 |
| 8,266,202 B1* | 9/2012 | Colton | G06F 8/30 | 709/202 |
| 8,285,813 B1* | 10/2012 | Colton | G06F 9/54 | 709/217 |
| 8,938,491 B1* | 1/2015 | Colton | G06F 15/16 | 709/203 |
| 8,954,989 B1* | 2/2015 | Colton | G06F 9/46 | 709/203 |
| 9,106,704 B2* | 8/2015 | Altberg | G06Q 30/02 | |
| 9,122,650 B1* | 9/2015 | Colton | G06F 17/20 | |
| 2003/0105821 A1* | 6/2003 | Shah | H04L 51/14 | 709/206 |
| 2004/0019678 A1* | 1/2004 | St. Pierre | G06F 9/547 | 709/225 |
| 2004/0019682 A1* | 1/2004 | St. Pierre | H04L 29/06 | 709/227 |
| 2004/0019804 A1* | 1/2004 | St. Pierre | H04L 63/083 | 709/227 |
| 2004/0078486 A1* | 4/2004 | Salahshoor | H04L 67/42 | 709/245 |
| 2004/0093515 A1* | 5/2004 | Reeves, Jr. | | 713/201 |
| 2005/0050214 A1* | 3/2005 | Nishiyama | H04L 67/40 | 709/229 |
| 2005/0256933 A1* | 11/2005 | Millington | H04L 67/02 | 709/207 |

(Continued)

OTHER PUBLICATIONS http://wiki.secondlife.com/wiki/Reserse_HTTP, Reverse HTTP From Second Life Wiki, 2 pgs. Nov. 16, 2009.

(Continued)

*Primary Examiner* — Kostas Katsikis
(74) *Attorney, Agent, or Firm* — Schwegman Lundberg & Woessner, P.A.

(57) ABSTRACT

In one embodiment, a method is provided for exchanging callback information. In this method, a first request-response based protocol request is transmitted to a computing device, and a first request-response based protocol response is received from the computing device. Here, the first request-response based protocol response is identified to encapsulate a callback request and this callback request is extracted from the first request-response based protocol response. The callback request is then processed to generate a callback response, and the callback response is encapsulated in a second request-response based protocol request. The second request-response based protocol request is transmitted to the computing device, and a second request-response based protocol response is received after the transmission of the second request-response based protocol request from the computing device. Here, the second request-response based protocol response is a response to the first request-response based protocol request.

23 Claims, 7 Drawing Sheets

(56) References Cited

U.S. PATENT DOCUMENTS

| | | | |
|---|---|---|---|
| 2005/0289222 A1* | 12/2005 | Sahim | H04L 29/06027 709/206 |
| 2006/0080394 A1* | 4/2006 | Goodman | H04L 63/101 709/206 |
| 2007/0165821 A1* | 7/2007 | Altberg | H04L 29/06027 379/210.02 |
| 2008/0215961 A1* | 9/2008 | Altberg | H04L 12/14 715/205 |
| 2008/0307051 A1* | 12/2008 | McCarthy | 709/203 |
| 2009/0248797 A1* | 10/2009 | Chiba | H04L 41/026 709/203 |
| 2010/0153454 A1* | 6/2010 | Rehm | G06F 11/3636 707/791 |

OTHER PUBLICATIONS

Lentczner, M. , "Reverse HTTP draft-Lentczner-fhttp-00", http://tools.ietf.org/html/draft-lentczner-rhttp-00, 8 pgs. Nov. 16, 2009.

* cited by examiner

EXCHANGE OF CALLBACK INFORMATION

FIELD

The present disclosure relates generally to computer network communication. In an embodiment, the disclosure relates to an exchange of callback information.

BACKGROUND

In general, Hypertext Transfer Protocol (HTTP) is used to request and transmit data (e.g., Webpages and Webpage components) over the Internet or other computer networks. Since HTTP is a request-response based protocol, the role of a client to request information and the role of a server to provide such information are well defined. As a result, for example, within a particular HTTP connection, a server cannot change its role to initiate HTTP requests like a client. In view of the limitation, current techniques to exchange information outside the typical client and server roles use the maintenance of an additional HTTP destination. However, such maintenance requires both technical settings and appropriate user accounts with the proper authorities for the client system.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details.

The embodiments described herein provide techniques for exchanging callback information. It should be appreciated that in some applications, additional information (hereinafter "callback information") may need to be exchanged before a request-response based protocol response can be generated. Such callback information is often available at a client computing device. As used herein, a "request-response based protocol" refers to a communications protocol, such as HTTP or Hypertext Transfer Protocol Secure (HTTPS), over which devices can exchange information by way of requests and responses.

To exchange callback information within a session, computing devices that are in communication with each other encapsulate the callback information in request-response based protocol messages. As explained in more detail below, a variety of different techniques may be used to encapsulate the callback information. The computing devices then exchange the request-response based protocol messages with encapsulated callback information. Thus, the computing devices basically use request-response based protocol messages to communicate callback information.

Figure 1:
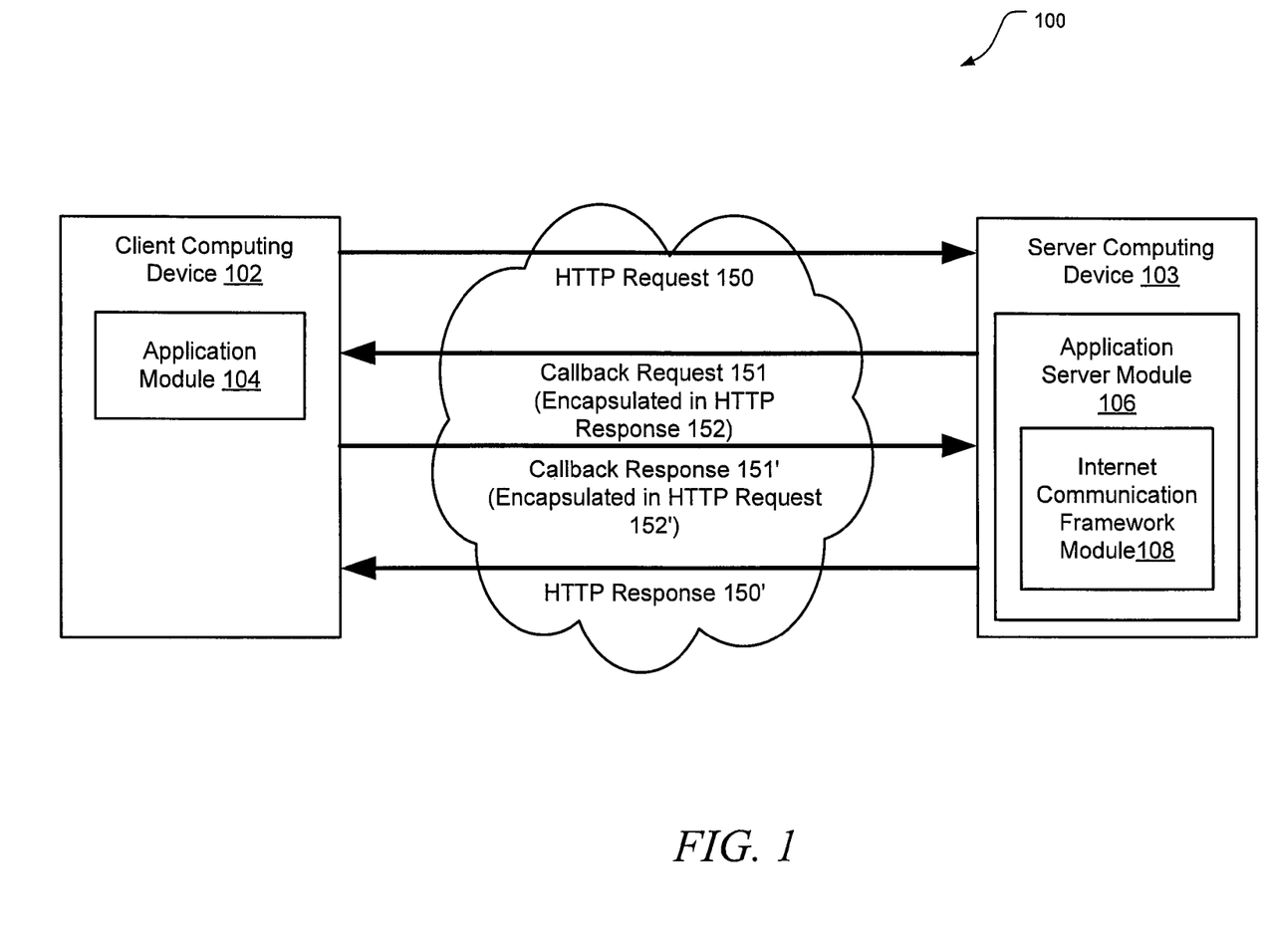
FIG. 1 depicts a block diagram of a system, consistent with one embodiment, for exchanging callback information within a single HTTP connection.

FIG. 1 depicts a block diagram of a system 100, consistent with one embodiment, for exchanging callback information within a single HTTP connection. The system 100 includes a client computing device 102 that is in communication with a server computing device 103. The client computing device 102 is configured to host an application module 104, which includes a variety of different applications, such as a Web browser, a sales order application, and other applications. The server computing device 103 is configured to host an application server module 106. An application server module 106 may be an application server that delivers applications to client computing devices, such as client computing device 102. The application server module 106 may handle, for example, business logic and data access of the application module 104. Examples of the application server module 106 include a JAVA application server, an Apache server, and an Advanced Business Application Programming (ABAP) Application Server. In this example, an Internet communication framework (ICF) module 108 is integrated into the application server module 106. It should be noted that the ICF module 108 generally handles communication to and from other computing devices by way of HTTP, HTTPS, SMTP, and/or other communication protocols. For example, in a Netweaver ABAP Application Server, the ICF module 108 can be a part of a communication layer that provides client and server side communication on top of the HTTP/HTTPS/SMTP protocol. As a result, for example, when the application module 104 sends an HTTP request, waits for receiving an HTTP response, or receives an HTTP response, the communication functionality (e.g., HTTP send/wait/receive) can be provided by the ICF module 108. The ICF module 108 may also, for example, provide a standard interface for communication with request-response based protocols.

Embodiments of the present invention provide techniques and infrastructures, such as the system 100, for client and server computing devices to exchange callback information by temporarily changing their roles as client and server. The server computing device 103, which is particularly configured to provide services to clients, can temporarily change its role to function more like a client and thereby be configured to initiate requests to the client computing device 102. Similarly, the client computing device 102, which is configured to access remote services, can also temporarily change its role to function more like a server to provide callback information to the server computing device 103.

In exchanging roles, a callback layer is established on top of the existing HTTP. In order to conform to the HTTP request-response communication phase model, callback messages are encapsulated in HTTP messages. In particular, in the example depicted in FIG. 1, the client computing device 102 initially opens an HTTP connection to the server computing device 103 and transmits an HTTP request 150 to the server computing device 103. An "HTTP request," such as the HTTP request 150, refers to an HTTP message asking for information. Examples of such an HTTP request 150 include "GET," "POST," or other requests. An HTTP connection refers to a persistent connection maintained by the server computing device 103. It should be noted that a single persistent connection (e.g., called HTTP keep-alive or HTTP connection reuse) uses, for example, the same Transmission Control Protocol (TCP) connection to send and receive multiple request-response based protocol requests/responses, as opposed to opening a new one for every single request/response pair. Maintaining a persistent connection may result in less network traffic due to fewer instances of setting up and tearing down of TCP connections and may also result in reduced latency on subsequent requests.

Upon receipt of the HTTP request 150, the server computing device 103 may initiate a callback request 151. As used herein, a "callback request," such as the callback request 151, refers to one or more requests made by either the client computing device 102 or the server computing device 103 after the client computing device 102 made an initial HTTP request 150. The callback request 151 may be another HTTP request or in a variety of other protocols or formats, such as a File Transfer Protocol (FTP) request, SMTP request, and database access request.

Still referring to FIG. 1, given that the client computing device 102 and the server computing device 103 communicate by way of HTTP, the server computing device 103 encapsulates the callback request 151 in an HTTP response 152. An "HTTP response," such as HTTP responses 150' and 152, refers to an HTTP message generated in response to an HTTP request. An HTTP response may include the resource that was requested by the HTTP request. Here, it should be appreciated that the HTTP response 152 with the encapsulated callback request 151 is not a direct response to the HTTP request 150 previously transmitted by the client computing device 102. Rather, as explained in more detail below, the server computing device 103 will later respond to the HTTP request 150 after all the callback requests and callback responses, such as callback request 151 and callback response 151', have been processed.

Upon receipt of the HTTP response, the client computing device 102 can identify that the received HTTP response 152 encapsulates a callback request 151. The client computing device 102 thereafter extracts the callback request 151 from the HTTP response 152 and processes the callback request 151 to generate a callback response 151'. A "callback response," such as the callback response 151', refers to a message or other information generated in response to a callback request. Given that the client computing device 102 and the server computing device 103 communicate by way of HTTP, the client computing device 102 encapsulates the callback response 151' in another HTTP request 152' and transmits the HTTP request 152' to the server computing device 103.

After processing the callback response 151', the server computing device 103 can then proceed with processing the initial HTTP request 150 and can generate and transmit its HTTP response 150' to the client computing device 102. Upon receipt of the HTTP response 150', the client computing device 102 may close the HTTP connection. In this example, the standard request-response interaction according to HTTP may be preserved because the server computing device 103 still transmits HTTP responses 150' and 152. Similarly, the client computing device 102 still transmits HTTP requests 150 and 152'. Therefore, the involved intermediaries (e.g., proxies, reverse proxies, and firewalls) may not detect any changes in the behavior of HTTP. Additionally, the ability to communicate callback information may result in less network traffic because a client computing device does not need to request all information from a server computing device in a single request. Given that the client computing device can request any additional information after transmittal of the HTTP request, the client computing device can request information that is in need.

In addition to the client/server system 100 depicted in FIG. 1, it should be further noted that the callback channel generally discussed above can also be provided between different application servers (e.g., between SAP Web application server and JAVA 2 Platform, Enterprise Edition (J2EE) engines or even between other Web application servers). Additionally, in other embodiments, the computing devices 102 and 103 may include fewer, more, or different modules apart from those shown in FIG. 1. For example, in another embodiment, the client computing device 102 may also include an ICF module that is similar to the ICF module 108 hosted on the server computing device 103.

Figure 2:
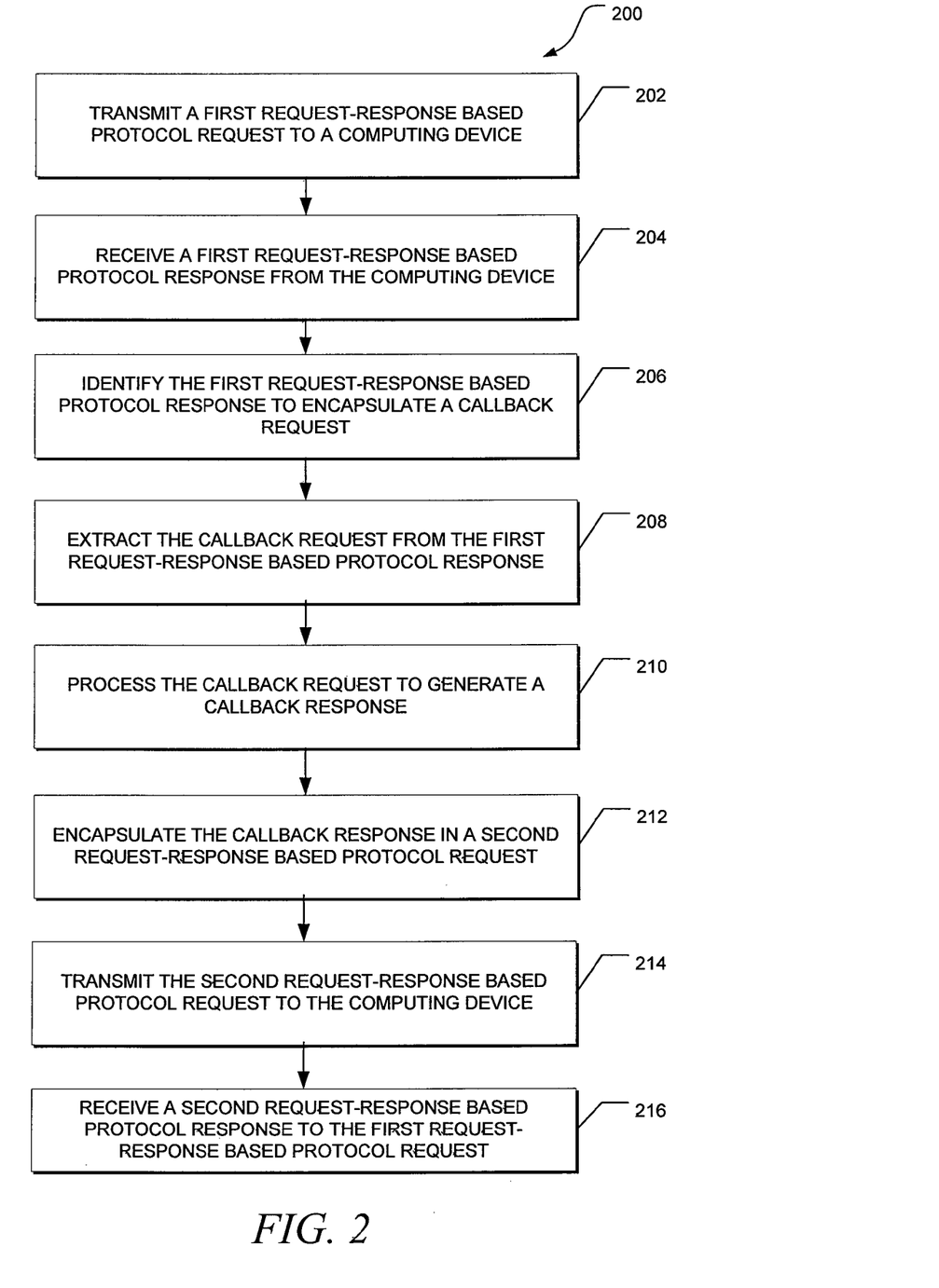
FIG. 2 depicts a flow diagram of a general overview of a method, in accordance with an embodiment at a client computing device, for exchanging callback information.

FIG. 2 depicts a flow diagram of a general overview of a method 200, in accordance with an embodiment at a client computing device, for exchanging callback information. In this embodiment, the method 200 may be implemented by the application module 104 and employed in the client computing device 102 of FIG. 1. As depicted in FIG. 2, the client computing device transmits, at 202, a request-response based protocol request (namely, a "first" request-response based protocol request) to another computing device, such as a server computing device. In response to the first request-response based protocol request, a request-response based protocol response (namely, a "first" request-response based protocol response) is received from the computing device at 204.

Identification is then made at 206 that this first request-response based protocol response encapsulates a callback request. It should be appreciated that in embodiments of the present invention, encapsulation is the process or method of adding callback information (e.g., callback request or callback response) to a request-response based protocol message. As explained in more detail below, the callback request may be encapsulated in the request-response based protocol response using a variety of different encapsulation techniques. The callback request is extracted from the first request-response based protocol response at 208, and this callback request is then processed at 210, thereby generating a callback response.

The client computing device then encapsulates the callback response in another request-response based protocol request (namely, a "second" request-response based protocol request) at 212. A variety of different encapsulation techniques may be used to encapsulate the callback information (e.g., callback request or callback response) in a request-response based protocol message (e.g., request-response based protocol request or request-response based protocol response). In one embodiment, for example, the callback response may be serialized into a file and this file may then be attached to the second request-response based protocol request. The callback response may be serialized into a variety of different file formats. As an example, the callback response may be serialized into a binary file. In another example, the callback response may be serialized into an extensible markup language (XML) file. In yet another example, the callback response may be serialized into a JavaScript Object Notation (JSON) message. In an alternate embodiment, the callback response can be encapsulated in the second request-response based protocol request by embedding the callback response into a message body of the request-response based protocol request.

At 214, the client computing device then transmits this second request-response based protocol request with the encapsulated callback response to the server computing device. Given that there are no additional callback requests from the server computing device, the client computing device then receives another request-response based protocol response (namely, a "second" request-response based protocol response) at 216. This second request-response based protocol response is not in response to the callback request, but it is actually in response to the first request-response based protocol request, which was transmitted at 202.

It should be appreciated that the operations associated with method 200 may all occur within a single persistent connection. As a result, for example, the client computing device may not need to open additional connections to a server computing device in order to exchange callback information, thereby possibly reducing latency associated with the exchange of callback information. Furthermore, given that callback information is exchanged within a single persistent connection or session, a common shared area for storage of, for example, callback information, may not need to be maintained. That is, callback requests and responses are not stored in a common shared area that is configured to store callback information from different sessions. Alternatively, the operations associated with the method 200 may also occur in multiple connections. Accordingly, a "connection," as used herein, can refer to a single persistent connection or multiple connections.

Figure 3:
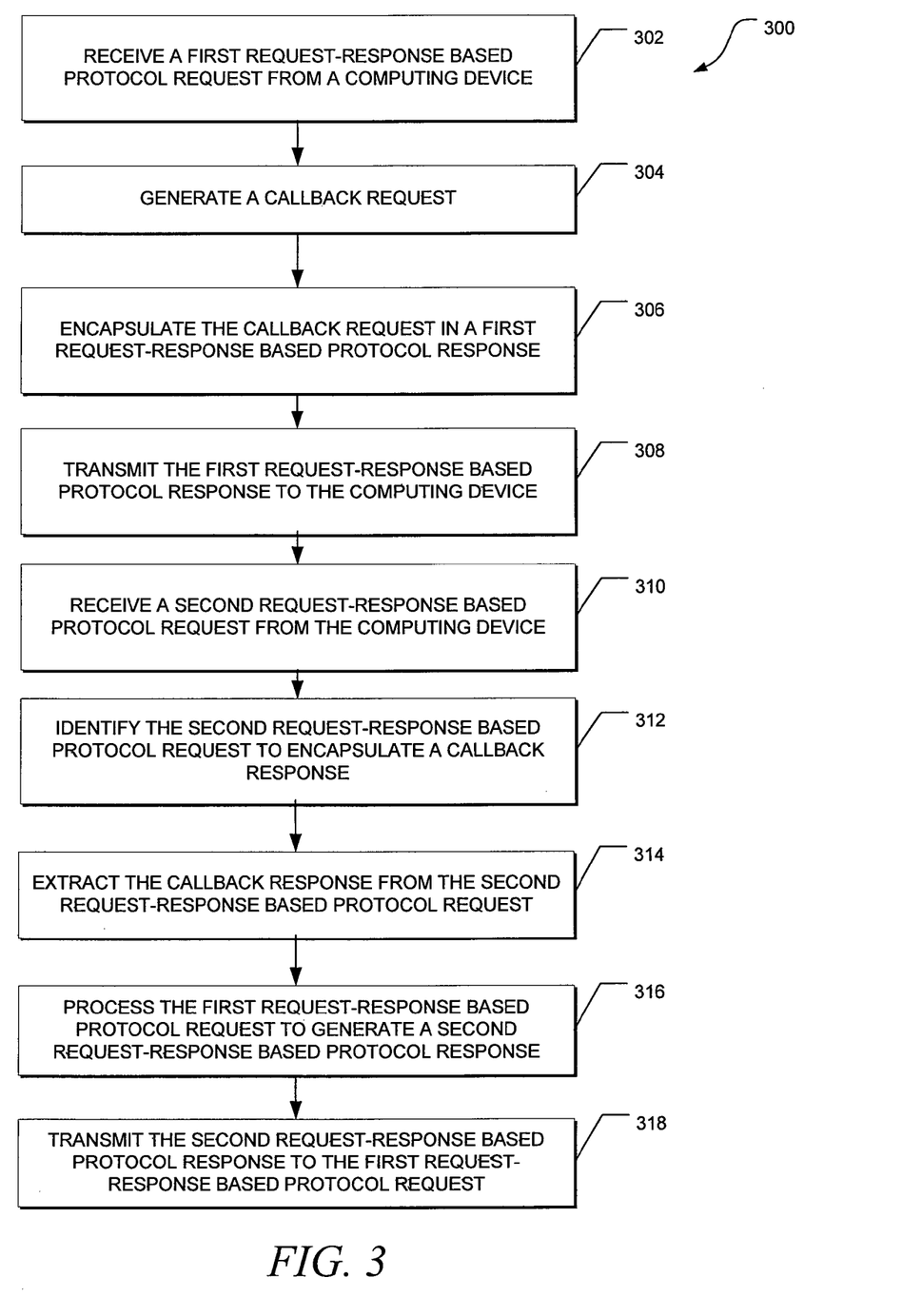
FIG. 3 depicts a flow diagram of a general overview of a method, in accordance with an embodiment at a server computing device, for exchanging callback information.

FIG. 3 depicts a flow diagram of a general overview of a method 300, in accordance with an embodiment at a server computing device, for exchanging callback information. In this embodiment, the method 300 may be implemented by an application server module 106 and employed in the server computing device 103 of FIG. 1. As depicted in FIG. 3, the server computing device receives a request-response based protocol request (namely, a "first" request-response based protocol request) at 302 from a computing device, such as a client computing device. Here, the server computing device also generates a callback request at 304, which is encapsulated in a request-response based protocol response (namely, a "first" request-response based protocol response) at 306. This first request-response based protocol response is then transmitted to the client computing device at 308.

After the transmission of the first request-response based protocol response, the server computing device receives another request-response based protocol request (namely, a "second" request-response based protocol request) from the client computing device at 310. Identification is then made at 312 that the second request-response based protocol request encapsulates a callback response, and this callback response is extracted from the second request-response based protocol request at 314. Given that there are no additional callback requests from the client computing device, the server computing device processes the first request-response based protocol request, which was received previously at 302, to generate another request-response based protocol response (namely, a "second" request-response based protocol response) at 316. Similarly, this second request-response based protocol response is not a response to any callback requests, but it is a response to the initial, first request-response based protocol request. The server computing device then transmits this second request-response based protocol response to the client computing device at 318.

Figure 4:
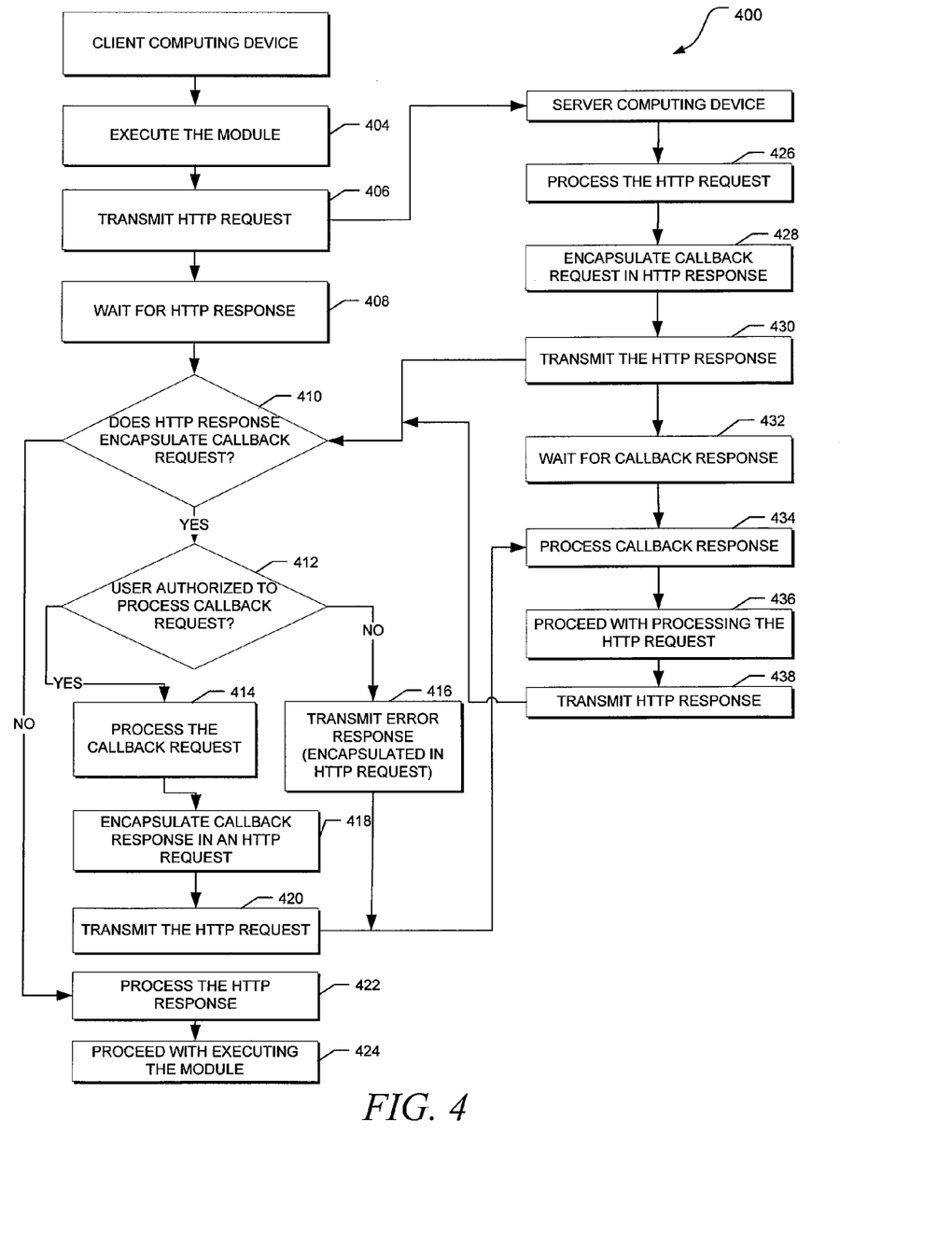
FIG. 4 depicts a flow diagram of a detailed method, in accordance with an alternate embodiment, of a client computing device and a server computing device exchanging callback information.

FIG. 4 depicts a flow diagram of a detailed method 400, in accordance with an alternate embodiment, of a client computing device and a server computing device exchanging callback information within a single HTTP connection. In this example, the method 400 may be implemented by the application module 104 and the ICF framework module 108, and employed in the client computing device 102 and the server computing device 103, respectively, as depicted in FIG. 1. In FIG. 4, the client computing device executes a module, such as an application module, at 404. As an example, this application module may be a sales order application that processes sales orders. The processing of a sales order results in an initiation of an HTTP request in the form of, for example, a POST method that includes information regarding an item requested by the sales order. The client computing device transmits this HTTP request at 406 to the server computing device and waits for an HTTP response at 408 from the server computing device.

In one embodiment, the HTTP request transmitted by the client computing device at 406 may include information identifying or informing other computing devices whether the client computing device is able to process callback requests. As an example, this information informs the server computing device whether the client computing device can or cannot handle callback requests. For a dedicated HTTP channel, the client computing device can specify whether a callback request is supported by setting a dedicated attribute of an HTTP client object/class or by configuring an HTTP destination such that a callback request is permitted or rejected.

For example, the HTTP request includes a header field, and the identifying information may be inserted in this header field (e.g., sap-version). An example of such an HTTP request is provided in the following Table A.

TABLE A

POST /sap/bc/crm/salesorder/service_1 HTTP/1.1
Host: myhost.mydomain.com
user-agent: SAP NetWeaver Application Server (1.0; 7.20)
sap-version: 1.0
Content-Type: text/xml; charset=utf-8
. . .

After transmission of the HTTP request, the client computing device may then receive an HTTP response from the server computing device. Identification is made at 410 whether the received HTTP response encapsulates a callback request. This callback request may, for example, be another HTTP request requesting additional information from the client computing device, such as information on the buyer of the item associated with the sales order. The identification can be made by checking the contents of the HTTP response to identify whether it encapsulates a callback request. If the client computing device identifies that the HTTP response does not encapsulate a callback request, then the client computing device processes the HTTP response at 422 and proceeds with execution of the application module at 424.

On the other hand, if the client computing device identifies at 410 that the HTTP response encapsulates a callback request, then at 412 the HTTP runtime, for example, checks the user authorizations for processing the callback request. If the user is not authorized, then an error response, which is encapsulated in an HTTP request, is transmitted to the server computing device at 416. It should be appreciated that the check of whether the callback request is allowed or not can depend on various criteria. In another example, checks may instead be based on setting of HTTP client destination, which may depend on the communication partner and channel. It should be further noted that the processing of the callback request can be handled in the HTTP client context (e.g., client memory area) and additionally outside of the client context (e.g., on the same client computing device but in a new context).

However, if identification is made at 412 that the user is authorized, then the callback request is processed at 414 to generate a callback response. Before transmitting the callback response to the HTTP server, the client computing device encapsulates the callback response in an HTTP request at 418 and transmits the HTTP request to the server computing device at 420. As discussed above, a variety of different encapsulation techniques may be employed. In one embodiment, the callback response can be serialized into a file, and this file may then be attached to the HTTP request. With this technique, the HTTP request becomes a multiple part (or multipart) message, in which one or more different sets of data are combined in a single body. Here, a dedicated multipart type (e.g., a "Content-Type: multipart/x-sap-entity") can be used to attach a serialized callback response as binary data or binary data (e.g., Binary Large Object (BLOB) data) into the HTTP request. The following Table B provides such an example.

TABLE B

HTTP/1.1 200 OK
server: SAP NetWeaver Application Server / ABAP 720
sap-version: 1.0
sap-cb-serialization: request/multipart
Content-Type: multipart/mixed; boundary="request boundary 4711"
...
-- request boundary 4711
Content-Type: application/x-sap-entity
...

As discussed above, in addition to binary data, a variety of other serialization techniques may be used to encapsulate the callback response. Furthermore, the recipient of the HTTP request (e.g., a server computing device) may need information on the serialization method used such that it can extract the callback response. Here, in one embodiment, a dedicated header field (e.g., sap-cb-serialization) that provides such information may be included in the HTTP request. Still referring to 418, in another embodiment of an encapsulation technique, the callback response can be embedded in the message body of the HTTP request. For example, the HTTP header fields with a certain prefix (e.g., sap-cb<field_name>) can be used to distinguish the request header fields from the HTTP response fields. These HTTP header fields can be tagged with a prefix (e.g., sap-cb-<tag-field>:<tag-value>). The following Table C provides an example of a callback response, which is embedded within the HTTP request that is transmitted to the server computing device at 420. For this technique, the header field "sap-cb-serialization" is set properly.

TABLE C

POST /sap/bc/crm/salesorder/service_1 HTTP/1.1
Host: myhost.mydomain.com
user-agent: SAP NetWeaver Application Server (1.0; 7.20)

TABLE C-continued sap-version: 1.0
sap-cb-serialization: response/multipart
Content-Type: multipart/mixed; boundary="response boundary 8088"
...
-- response boundary 8088
Content-Type: application/x-sap-entity
...

Thereafter, the callback response is transferred into the HTTP request and the content related header fields (e.g., content-type and content-length) without further transformations and adding prefixes, respectively. Such an example of the HTTP request is provided in the following Table D.

TABLE D

HTTP/1.1 200 OK
server: SAP NetWeaver Application Server / ABAP 720
sap-version: 1.0
sap-cb-serialization: request/inplace; prefix=sap-cb
sap-cb-start-line POST /sap/bc/crm/salesorder/service_1 HTTP/1.1
sap-cb-Host: myhost.mydomain.com
sap-cb-user-agent: SAP NetWeaver Application Server (1.0; 7.20)
sap-cb-sap-version: 1.0
Content-Type text/xml; charset=utf-8
Content-Length: 3987
...

Still referring to FIG. 4, the server computing device receives the HTTP request transmitted from the client computing device at 406 and processes the HTTP request at 426 to generate a callback request to the client computing device. The callback request may, for example, be a request for information on the buyer of the item associated with the sales order. In this example, an ICF module hosted in the server computing device provides an environment for handling HTTP requests in ABAP work processes. Particularly, the ICF can execute HTTP requests and also callback requests.

The server computing device encapsulates the callback request in an HTTP response at 428 and then transmits the HTTP response with the encapsulated callback request at 430 to the client computing device. The server computing device then waits to receive a callback response at 432. It should be appreciated that, in one embodiment, the exchange of callback information is based on stateful communication. In particular, a session is set temporarily to a stateful communication for the callback request-response phase, and an associated session identifier (for stateful communication) is transferred to the client for the next call (e.g., HTTP request including callback response). It should be noted that in stateful communication, all user activities in a session are performed in a single context (role area) and accordingly, the single persistent connection in this example is based on stateful communication.

With the receipt of a callback response, which is encapsulated in an HTTP response, from the client computing device, the server computing device then processes the callback response at 434. In this example, the callback response includes information on the buyer of the item associated with the sales order. Given that there are no additional callback requests, the server computing device then proceeds or continues to process the initial HTTP request at 436, which was transmitted by the client computing device at 406. In the processing of the initial HTTP request, an HTTP response that includes, for example, a sales order confirmation, is generated and this HTTP response is then transmitted to the client computing device at 438.

Figure 5:
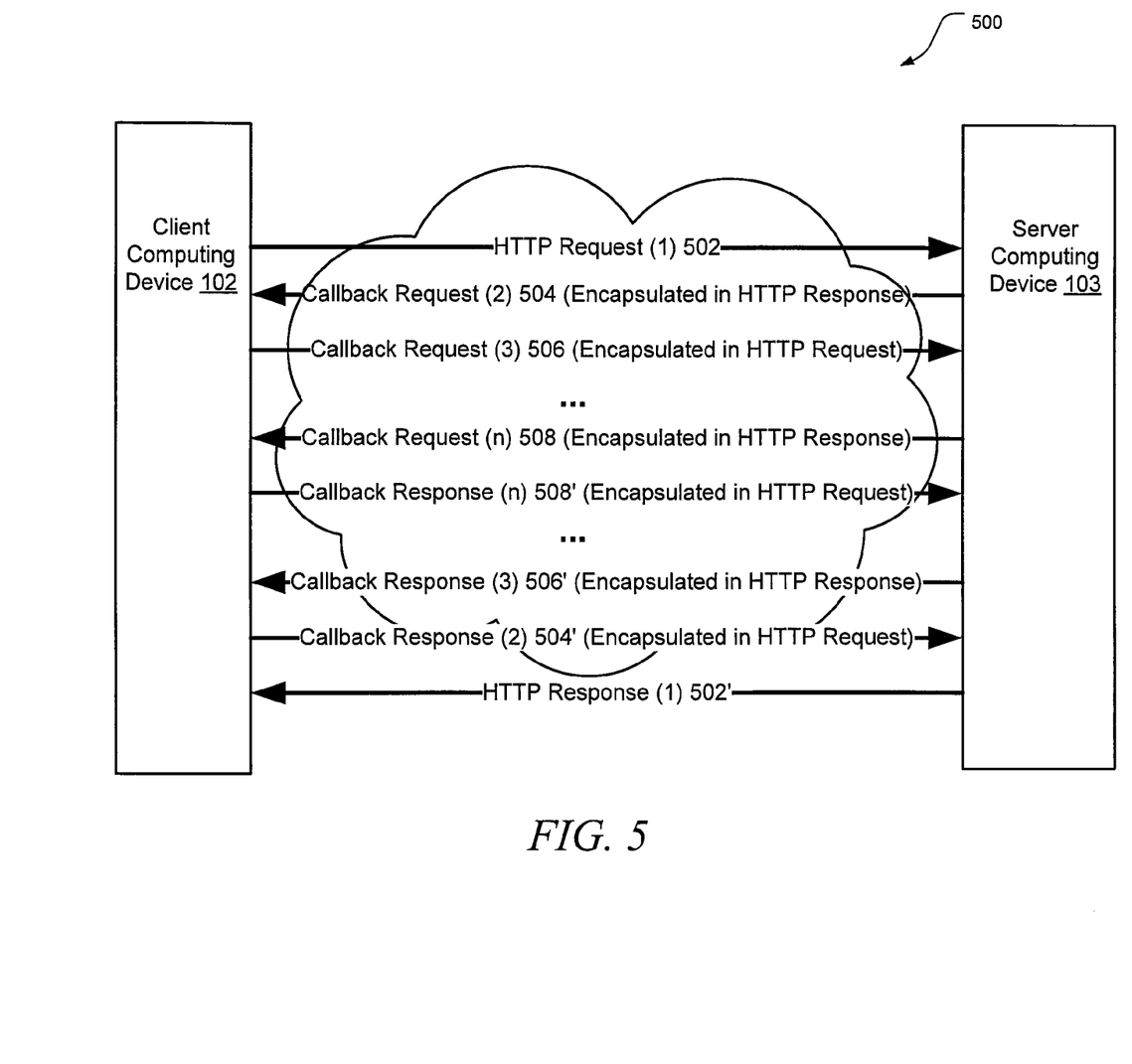
FIG. 5 depicts a block diagram of another system, in accordance with an alternative embodiment, for exchanging multiple callback requests and responses.

FIG. 5 depicts a block diagram of another system 500, in accordance with an alternative embodiment, for exchanging multiple callback requests and responses within a single HTTP connection. The system 500 includes a client computing device 102 that is in communication with a server computing device 103. Rather than a single callback request, the server computing device 103 can transmit multiple callback requests to the client computing device 102. Vice versa, the client computing device 102 may transmit multiple callback responses to the server computing device 103. Therefore, for example, such a mechanism may facilitate the transmission of additional information (e.g., documents and messages) to the client computing device 102.

In one embodiment, the callbacks requests and responses can be processed and executed in a cascading sequence. For example, as depicted in FIG. 5, the client computing device 102 initially transmits an HTTP request 502 to the server computing device 103. Thereafter, the server computing device 103 and the client computing device 102 can exchange multiple callback requests 504, 506, and 508, which are encapsulated in HTTP responses or HTTP requests. In turn, the client computing device 102 and the server computing device 103 may respond by transmitting multiple callback responses 504', 506', and 508', which are also encapsulated in HTTP responses or HTTP requests. In the example of FIG. 5, the appropriate pairings of the callback request/callback response pair are identified by the numbering of 1, 2, 3, . . . n. As an example, the callback response (3) 506' is transmitted in response to the callback request (3) 506. Similarly, the callback response (2) 504' is transmitted in response to the callback request (2) 504. After all the callback requests and callback responses have been exchanged, the server computing device 103 transmits the HTTP response (1) 502' that is in response to the initial HTTP request (1) 502. After the HTTP response (1) 502' is transmitted, the server computing device 103 may then close the HTTP connection.

Figure 6:
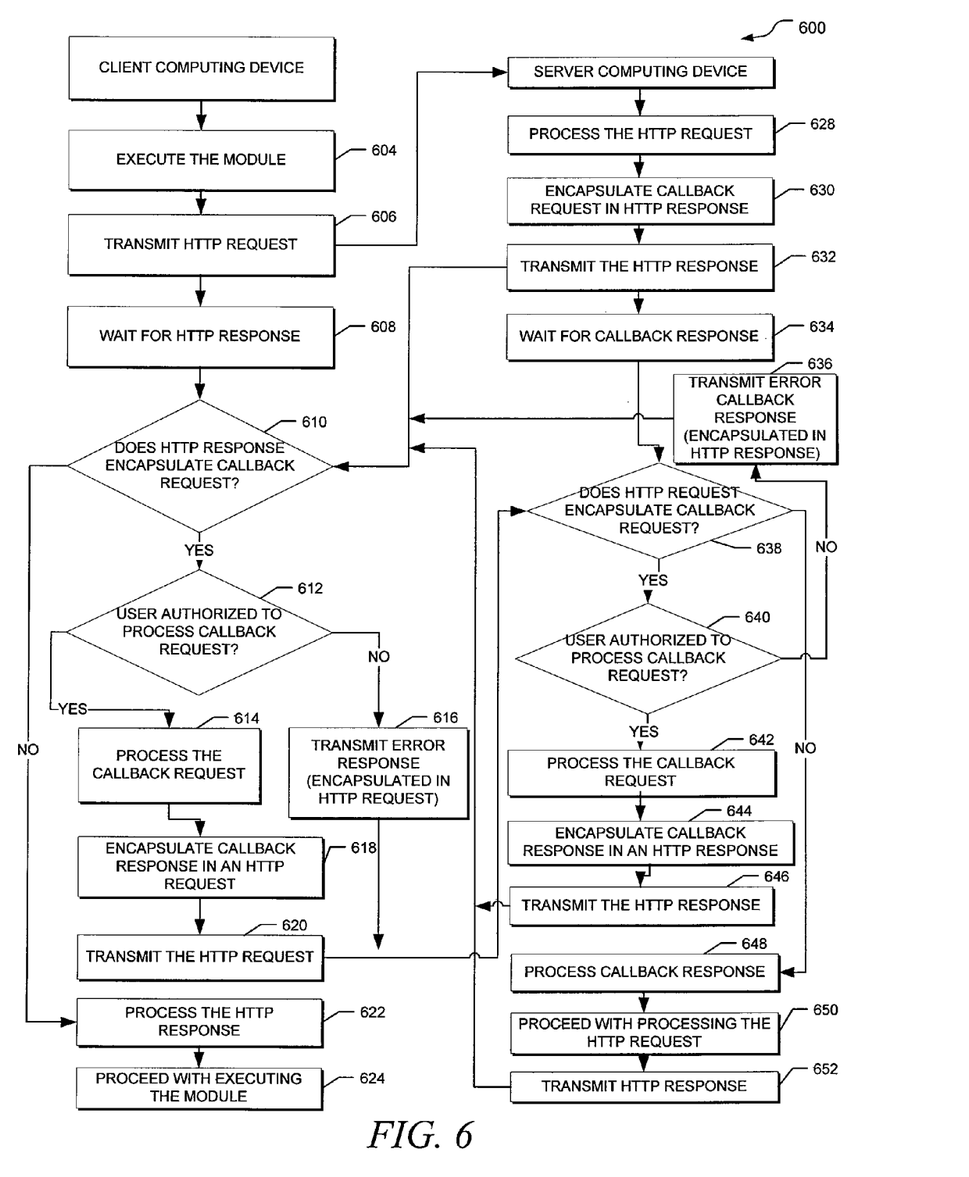
FIG. 6 depicts a flow diagram of a detailed method, in accordance with yet another embodiment, of a client computing device and a server computing device exchanging multiple callback requests and responses.

FIG. 6 depicts a flow diagram of a detailed method 600, in accordance with yet another embodiment, of a client computing device and a server computing device exchanging multiple callback requests and responses within a single HTTP connection. In this example, the method 600 may be implemented by the application module 104 and the ICF framework module 108, and employed in the client computing device 102 and the server computing device 103, respectively, as depicted in FIG. 1. As depicted in FIG. 6, the client computing device executes a module, such as an application module, at 604. The client computing device transmits this HTTP request at 606 to the server computing device and waits for an HTTP response at 608 from the server computing device.

In the example of an ABAP program, an HTTP client object is created using, for example, an ABAP class "cl_HTTP_client=> create_by_destination" associated with an HTTP client session. Callback requests are enabled or allowed in the existing HTTP client session by using, for example, an ABAP method "allow_callback_request." The request object is filled with Uniform Resource Locator (URL) and callback request information. The client computing device then transmits the HTTP request using an ABAP method "send" and then waits for an HTTP response use an ABAP method "receive."

The server computing device receives the HTTP request transmitted from the client computing device at 606 and processes the HTTP request at 628 to generate a callback request to the client computing device. In this example, an ICF module hosted in the server computing device provides an environment for handling HTTP requests in ABAP work processes. Particularly, the ICF can execute HTTP requests and also callback requests. For example, the ICF runtime may instantiate an ABAP class associated with the requested URL (also known as an HTTP handler class). An execution of the ABAP interface method "IF_HTTP_EXTENSION~HANDLE_REQUEST," which is implemented by the ABAP handler class, can be triggered. During execution of a handler class, the callback request is initiated by an application, such as an HTTP client call. In a particular example, an HTTP client object is created using, for example, the ABAP class "cl_HTTP_client=>create_for_callback." The request object is filled with URL and callback request information. The server computing device then encapsulates the callback request in the HTTP response at 630 and transmits the HTTP response at 632 using the ABAP method "send." The server computing device then waits at 634 for additional callback responses, if any, using the ABAP method "receive."

After transmission of the HTTP request, the client computing device may then receive an HTTP response from the server computing device. Identification is made at 610 whether the received HTTP response encapsulates a callback request. If the client computing device identifies that the HTTP response does not encapsulate a callback request, then the client computing device processes the HTTP response at 622 and proceeds with execution of the application module at 624.

On the other hand, if the client computing device identifies that the HTTP response encapsulates a callback request at 610, then the HTTP runtime, for example, checks the user authorizations at 612 for the processing of the callback request. If the user is not authorized, then an error response, which is encapsulated in an HTTP request, is transmitted to the server computing device at 616. However, if identification is made at 612 that the user is authorized, then the callback request is processed at 614 to generate a callback response. Before transmitting the callback response to the HTTP server, the client computing device encapsulates the callback response in an HTTP request at 618, which is transmitted to the server computing device at 620.

In a particular example, at the client session, the HTTP response is received by the HTTP client method "receive." This ABAP method "receive" now detects the availability of a specified callback header field "sap-cb-serialization," which may indicate that the received HTTP response is not a response of the previous initiated HTTP request but rather, it is a callback request. Given that a callback request is encapsulated in the HTTP response, the same ABAP method "receive" deserializes the HTTP response, filters the deserialized HTTP response, and generates the callback request. The HTTP request is then analyzed to determine the HTTP handler classes associated with the HTTP URL. As a result, the ABAP method "IF_HTTP_EXTENSION~HANDLE_REQUEST" is executed on the involved HTTP classes. After execution of the method, the composed callback response is encapsulated by the ABAP method "receive" in an HTTP request with an HTTP server session as target URL. After transmission of the HTTP request to the server computing device, the client computing device then waits for additional callback responses, if any, using the ABAP method "receive."

Still Referring to FIG. 6, the server computing device receives the HTTP request from the client computing device, and identification is made at 638 whether the received HTTP request encapsulates a callback request made by the client computing device. If the server computing device identifies that the HTTP request does not encapsulate a callback request, then the server computing device processes a callback response at 648, which is encapsulated in an HTTP request received from the client computing device, and proceeds at 650 with execution of the processing of the original HTTP request, which was transmitted by the client computing device at 606. The processing of the HTTP request at 650 may generate another callback request, and this callback request, if generated, is encapsulated in an HTTP response, which is transmitted to the client computing device at 652.

On the other hand, if the server computing device identifies that the HTTP response encapsulates a callback request at 638, then the HTTP runtime, for example, checks the user authorizations at 640 for the processing of the callback request. If the user is not authorized, then an error callback response, which is encapsulated in an HTTP response, is transmitted to the client computing device at 636. However, if identification is made at 640 that the user is authorized, then the callback request is processed at 642, in which another callback response is generated. Before transmitting the callback response to the client computing device, the server computing device encapsulates the callback response in an HTTP response at 644, which is transmitted at 646 to the client computing device. Again, it should be appreciated that the check of whether the callback request is allowed or not can depend on various criteria. In another example, checks can also be based on the Internet Protocol (IP) address of the communication partner and channel (HTTP/HTTPS).

In a particular example, after receiving the HTTP request, the HTTP server session transfers this HTTP request to the ABAP method "receive," which detects the availability of the callback request in the context of the HTTP request (e.g., using availability of the header field "sap-cb-serialization"). Given that the HTTP request encapsulates a callback request, this callback request is provided to an application layer. After successful execution of the HTTP handler class in the HTTP server session (e.g., execution of the ABAP method "IF_HTTP_EXTENSION~HANDLE_REQUEST"), the composed HTTP response is transmitted back to the HTTP client session (or client computing device).

Figure 7:
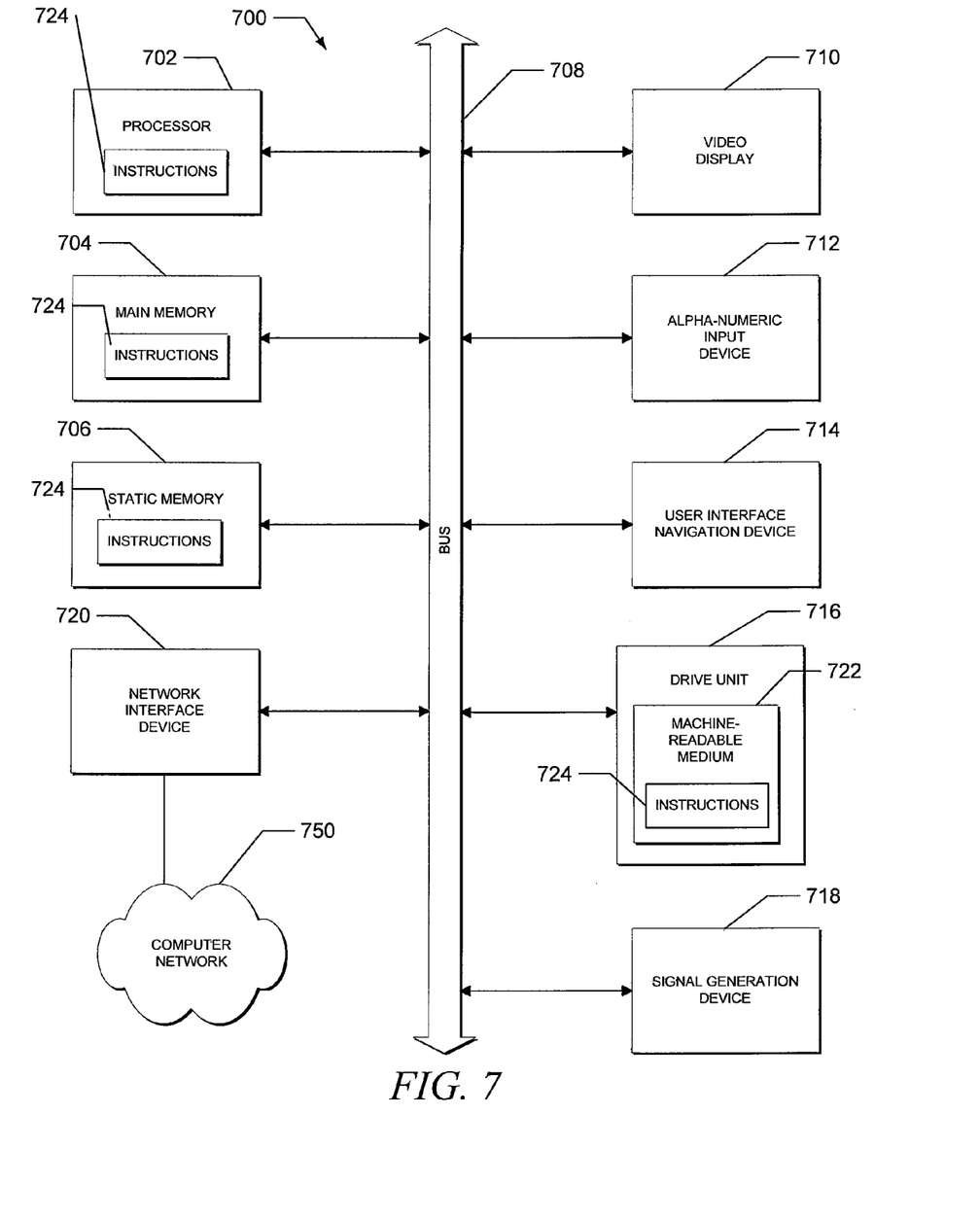
FIG. 7 depicts a block diagram of a machine in the example form of a computing device within which may be executed a set of instructions for causing the machine to perform any one or more of the methodologies discussed herein.

FIG. 7 depicts a block diagram of a machine in the example form of a computing device 700 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. Embodiments may also, for example, be deployed by Software-as-a-Service (SaaS), Application Service Provider (ASP), or utility computing providers, in addition to being sold or licensed via traditional channels.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computing device 700 includes a processor 702 (e.g., a central processing unit (CPU), a graphics processing unit (GPU) or both), a main memory 704 (e.g., random access memory (a type of volatile memory)), and static memory 706 (e.g., static random access memory (a type of volatile memory)), which communicate with each other via bus 708. The computing device 700 may further include video display unit 710 (e.g., a plasma display, a liquid crystal display (LCD) or a cathode ray tube (CRT)). The computing device 700 also includes an alphanumeric input device 712 (e.g., a keyboard), a user interface (UI) navigation device 714 (e.g., a mouse), a disk drive unit 716, a signal generation device 718 (e.g., a speaker), and a network interface device 720.

The disk drive unit 716 (a type of non-volatile memory storage) includes a machine-readable medium 722 on which is stored one or more sets of data structures and instructions 724 (e.g., software) embodying or utilized by any one or more of the methodologies or functions described herein. The data structures and instructions 724 may also reside, completely or at least partially, within the main memory 704 and/or within the processor 702 during execution thereof by computing device 700, with the main memory 704 and processor 702 also constituting machine-readable, tangible media.

The data structures and instructions 724 may further be transmitted or received over a computer network 750 via network interface device 720 utilizing any one of a number of well-known transfer protocols (e.g., HTTP).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 700) or one or more hardware modules of a computer system (e.g., a processor 702 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 702 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 702 configured using software, the general-purpose processor 702 may be configured as respective different hardware modules at different times. Software may accordingly configure a processor 702, for example, to constitute a particular hardware module at one instance of time and to constitute a different hardware module at a different instance of time.

Modules can provide information to, and receive information from, other hardware modules. For example, the described hardware modules may be regarded as being communicatively coupled. Where multiples of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 702 that are temporarily configured (e.g., by software) or permanently configured to perform the relevant operations. Whether temporarily or permanently configured, such processors 702 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 702 or processor-implemented modules. The performance of certain of the operations may be distributed among the one or more processors 702, not only residing within a single machine, but deployed across a number of machines. In some example embodiments, the processor or processors 702 may be located in a single location (e.g., within a home environment, an office environment or as a server farm), while in other embodiments the processors 702 may be distributed across a number of locations.

While the embodiment(s) is (are) described with reference to various implementations and exploitations, it will be understood that these embodiments are illustrative and that the scope of the embodiment(s) is not limited to them. In general, techniques for exchanging callback information may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method of exchanging callback information, the method comprising:
    transmitting a first request-response based protocol request to a computing device;
    receiving a first request-response based protocol response from the computing device;
    identifying the first request-response based protocol response to encapsulate a callback request;
    extracting the callback request from the first request-response based protocol response;
    processing the callback request to generate a callback response;
    encapsulating the callback response in a second request-response based protocol request;
    transmitting the second request-response based protocol request to the computing device; and
    receiving a second request-response based protocol response after the transmission of the second request-response based protocol request from the computing device, the second request-response based protocol response being a response to the first request-response based protocol request.

2. The method of claim 1, further comprising:
    generating an additional callback request before the transmitting of the second request-response based protocol request;
    encapsulating the additional callback request in a third request-response based protocol request before the transmitting of the second request-response based protocol request; and
    transmitting the third request-response based protocol request to the computing device before the transmitting of the second request-response based protocol request.

3. The method of, claim 1, wherein the exchange of the callback information is based on stateful communication.

4. The method of claim 1, wherein the first request-response based protocol response is not a response to the first request-response based protocol request.

5. The method of claim 1, wherein the first request-response based protocol request includes a header, the method further comprising inserting information in the header identifying a capability to process the callback request.

6. The method of claim 1, wherein the encapsulation of the callback response comprises:
    serializing the callback response into a file; and
    attaching the file to the second request-response based protocol request.

7. The method of claim 6, wherein the file is a binary file.

8. The method of claim 6, wherein the file is an eXtensible Markup Language (XML) file.

9. The method of claim 1, wherein the second request-response based protocol request includes a message body, and wherein the encapsulation of the callback response comprises embedding the callback response into the message body.

10. The method of claim 1, wherein the first and second request-response based protocol requests are Hypertext Transfer Protocol (HTTP) requests and the first and second request-response based protocol responses are HTTP responses.

11. A method of exchanging callback information, the method comprising:
    receiving a first request-response based protocol request from a computing device;
    generating a callback request;
    encapsulating the callback request in a first request-response based protocol response;
    transmitting the first request-response based protocol response to the computing device;
    receiving a second request-response based protocol request from the computing device;
    identifying the second request-response based protocol request to encapsulate a callback response;

extracting the callback response from the second request-response based protocol request;

processing the first request-response based protocol request to generate a second request-response based protocol response; and transmitting the second request-response based protocol response after the transmission of the first request-response based protocol response to the computing device, the second request-response based protocol response being a response to the first request-response based protocol request.

12. The method of claim 11, further comprising processing the callback response.

13. The method of claim 11, wherein the first request-response based protocol request includes a header, the method further comprising identifying information from the header a capability of the computing device to process the callback request.

14. The method of claim 11, wherein the encapsulation of the callback request comprises:
serializing the callback request into a file; and
attaching the file to the first request-response based protocol response.

15. The method of claim 14, wherein the file is a binary file or an eXtensible Markup Language (XML) file.

16. The method of claim 11, wherein the first request-response based protocol response includes a message body, and wherein the encapsulation of the callback request comprises embedding the callback request into the message body.

17. A non-transitory, machine-readable medium that stores instructions, which, when performed by a machine, cause the machine to perform operations comprising:
transmitting a first request-response based protocol request to a computing device;
receiving a first request-response based protocol response from the computing device;
identifying the first request-response based protocol response to encapsulate a callback request;
extracting the callback request from the first request-response based protocol response;
processing the callback request to generate a callback response;
encapsulating the callback response in a second request-response based protocol request;
transmitting the second request-response based protocol request to the computing device; and
receiving a second request-response based protocol response after the transmission of the second request-response based protocol request from the computing device, the second request-response based protocol response being a response to the first request-response based protocol request.

18. A non-transitory, machine-readable medium that stores instructions, which, when performed by a machine, cause the machine to perform operations comprising:
receiving a first request-response based protocol request from a computing device;
generating a callback request;
encapsulating the callback request in a first request-response based protocol response;
transmitting the first request-response based protocol response to the computing device;
receiving a second request-response based protocol request from the computing device;
identifying the second request-response based protocol request to encapsulate a callback response;
extracting the callback response from the second request-response based protocol request;
processing the first request-response based protocol request to generate a second request-response based protocol response; and
transmitting the second request-response based protocol response after the transmission of the first request-response based protocol response to the computing device, the second request-response based protocol response being a response to the first request-response based protocol request.

19. A computing device comprising:
at least one processor; and
a memory in communication with the at least one processor, the memory being configured to store an application server that is executable by the at least one processor, the application server having instructions that when executed by the at least one processor, cause operations to be performed, the operations comprising:
receiving a first request-response based protocol request from a different computing device;
generating a callback request;
encapsulating the callback request in a first request-response based protocol response;
transmitting the first request-response based protocol response to the different computing device;
receiving a second request-response based protocol request from the different computing device;
identifying the second request-response based protocol request to encapsulate a callback response;
extracting the callback response from the second request-response based protocol request;
processing the first request-response based protocol request to generate a second request-response based protocol response; and
transmitting the second request-response based protocol response after the transmission of the first request-response based protocol response to the different computing device, the second request-response based protocol response being a response to the first request-response based protocol request.

20. The computing device of claim 19, wherein the operation of encapsulating the callback request comprises:
serializing the callback request into a file; and
attaching the file to the first request-response based protocol response.

21. The computing device of claim 19, wherein the first request-response based protocol response includes a message body, and wherein the operation of encapsulating the callback request comprises embedding the callback request into the message body.

22. A computing device comprising:
at least one processor; and
a memory in communication with the at least one processor, the memory being configured to store an application module that is executable by the at least one processor, the application module having instructions that when executed by the at least one processor, cause operations to be performed, the operations comprising:
transmitting a first request-response based protocol request to a different computing device;
receiving a first request-response based protocol response from the different computing device;
identifying the first request-response based protocol response to encapsulate a callback request;
extracting the callback request from the first request-response based protocol response;

processing the callback request to generate a callback response;

encapsulating the callback response in a second request-response based protocol request;

transmitting the second request-response based protocol request to the different computing device; and receiving a second request-response based protocol response after the transmission of the second request-response based protocol request from the different computing device, the second request-response based protocol response being a response to the first request-response based protocol request.

23. The computing device of claim 22, wherein the operations are performed within a single persistent connection.

* * * * *